United States Patent
Shal et al.

(10) Patent No.: US 6,516,257 B2
(45) Date of Patent: Feb. 4, 2003

(54) METHOD AND SYSTEM FOR INDEPENDENT AXLE CONTROL OF A VARIABLE FORCE DAMPER SYSTEM

(75) Inventors: David A. Shal, Bellbrook, OH (US); Timothy J. Juuhl, Clarkston, MI (US); Michael R. Lukuc, New Carlisle, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/754,695

(22) Filed: Jan. 3, 2001

(65) Prior Publication Data

US 2002/0143448 A1 Oct. 3, 2002

(51) Int. Cl.[7] .............................. B60G 21/00; B62C 3/00; B62K 25/00; G06F 17/00; G06F 19/00; G06F 7/00
(52) U.S. Cl. ..................... 701/37; 701/38; 280/5.514; 280/5.503; 280/5.508; 280/5.515; 188/319.1; 188/284; 180/197; 290/40 A; 290/40 B; 104/292; 104/299

(58) Field of Search .................. 701/37, 38; 280/5.514, 280/5.503, 5.508, 5.515, 5.513; 188/319.1, 284, 282.2; 290/40 B, 40 A, 40 C; 180/197; 303/168; 318/57, 72; 104/292, 299; 287/64.15

(56) References Cited

U.S. PATENT DOCUMENTS

| | | | | | |
|---|---|---|---|---|---|
| 4,634,142 | A | * | 1/1987 | Woods et al. | 188/282.2 |
| 4,722,548 | A | * | 2/1988 | Hamilton et al. | 188/284 |
| 5,646,510 | A | * | 7/1997 | Kumar | 290/40 B |
| 5,998,880 | A | * | 12/1999 | Kumar | 290/40 A |
| 2001/0035049 | A1 | * | 11/2001 | Balch et al. | 73/488 |

* cited by examiner

*Primary Examiner*—William A. Cuchlinski, Jr.
*Assistant Examiner*—Ronnie Mancho
(74) *Attorney, Agent, or Firm*—Scott A. McBain

(57) ABSTRACT

The invention provides a method for independent axle control of a variable force damper system by providing at least one axle velocity signal from at least one vehicle sensor. The method then applies an axle control algorithm to the at least one axle velocity signal, thus determining at least one axle damping command as a function of the axle control algorithm.

20 Claims, 5 Drawing Sheets

```
                AXLE CORNER PWM DETERMINATION
DO FOR FRONT CORNERS (xx = LF, RF)
   IF (xx HPF RV > 0) THEN
       xx RAW AXLE PWM = FRONT AXLE PWM * AXLE_REBSF_F
   ELSE
       xx RAW AXLE PWM = FRONT AXLE PWM * AXLE_CMPSF_F
   ENDIF
END DO
DO FOR REAR CORNERS (xx = LR, RR)
   IF (xx HPF RV > 0) THEN
       xx RAW AXE PWM = REAR AXLE PWM * AXLE_REBSF_F
   ELSE
       xx RAW AXLE PWM = REAR AXLE PWM * AXLE_CMPSF_F
   ENDIF
END DO
```

FIG. 3C

```
               AXLE PWM SLEW RATE LIMITATION
DO FOR ALL CORNERS (xx = LF -> RF)
   IF FRONT CORNER (xx LF OR RF) THEN
       DELTA = FRONT AXLE DECREASING DELTA
   ELSE
       DELTA = REAR AXLE DECREASING DELTA
   ENDIF
   IF (xx RAW AXLE PWM > xx FILT AXLE PWM) THEN
       xx FILT AXLE PWM = xx RAW AXLE PWM
   ELSEIF [(xx FILT AXLE PWM - xx RAW AXLE PWM) > DELTA] THEN
       xx FILT AXLE PWM = xx FILT AXLE PWM - DELTA
   ENDIF
END DO
```

METHOD AND SYSTEM FOR INDEPENDENT AXLE CONTROL OF A VARIABLE FORCE DAMPER SYSTEM

TECHNICAL FIELD OF THE INVENTION

In general; the invention relates to controlled vehicle suspension systems. More specifically, the invention relates to coefficients of force being offset through suspension damping, and in particular, to a method and system for providing independent axle controls for use with suspension damping control outputs.

BACKGROUND OF THE INVENTION

Known variable force suspension systems include variable force shock absorbers and/or struts that provide suspension-damping forces at a magnitude controllable in response to commands provided by a suspension system controller. Some systems provide control between two damping states and others provide continuously variable control of damping force.

In a known manner of control of a variable force suspension, the demand force for each variable force damper is determined responsive to a set of gains, the wheel vertical velocity and the body heave, roll and pitch velocities. An example system determines the demand force as follows: $DF_b = G_h H' + G_r R' + G_p P' + G_w v$, where $DF_b$ is the demand force, $G_h$ is the heave gain, $G_r$ is the roll gain, $G_p$ is the pitch gain, $G_w$ is the wheel velocity gain, $H'$ is the body heave velocity, $R'$ is the body roll velocity, $P'$ is the body pitch velocity and v is the wheel vertical velocity. The portion of the demand force computation $G_h H' + G_r R' + G_p P'$, represents the body component determined responsive to the body heave, roll, and pitch velocities. The portion of the demand force computation $G_w v$ represents the wheel component determined responsive to the difference between the computed body corner velocity and the body-wheel relative velocity.

A control signal representing the determined demand force is output to control the variable force damper responsive to the demand force. Example variable force damper systems are described in U.S. Pat. Nos. 5,235,529, 5,096, 219, 5,071,157, 5,062,657, and 5,062,658.

Modules are typically used by variable force damper systems for identifying and controlling different aspects of automotive control. The modules typically use specialized algorithms designed for interpreting the automobiles input forces for a preferred control signal. One module known in the art commands individual damper outputs to a minimum damping state whenever the applicable desired force and damper wheel to body velocity signals are opposite in sign (a state in which the given damper is said to be in an "active" quadrant). Within the limits of damper travel for small to medium-sized inputs, this approach provides acceptable vehicle body motion control. However, on larger inputs that cause the limits of damper travel to be tested, the absence of damping in the "active" quadrants can allow very undesirable compression and/or rebound bumpstop impacts. In this context, compression and rebound bumpstops are defined as damper positions at which either full metal to metal impact and/or compression of one or more hard rubber parts occurs. To this end, wheel-to-body relative position-based "electronic bumpstop" algorithms have been used. Adversely, it has typically been difficult for the existing bumpstop algorithms known in the art to satisfactorily improve compression and/or rebound bumpstop impact energy without undesirable side effects on inputs that do not require the bumpstop algorithms use.

Therefore, it would be desirable to have an algorithm that would improve upon the above-mentioned situation, and related situations in which system control is released prematurely. Such an algorithm may provide superior gross motion control and reduced compression bumpstop activation during large events such as truck swells. Ideally, the algorithm would provide bumpstop and improved body motion control with minimal, if any, sacrifice in ride comfort and impact isolation.

SUMMARY OF THE INVENTION

One aspect of the invention provides a method for independent axle control of a variable force damper system by providing at least one axle velocity signal from at least one vehicle sensor. The method then applies an axle control algorithm to the at least one axle velocity signal, thus determining at least one axle damping command as a function of the axle control algorithm.

An additional embodiment of the method for independent axle control of a variable force damper system provides that the axle control algorithm is comprised of an axle velocity determination algorithm, an axle damping command determination algorithm, an axle corner damping command determination algorithm, and an axle damping command slew rate limitation algorithm.

Another embodiment of the invention includes a system for independent axle control of a variable force damper system comprising a means for providing at least one axle velocity signal. Also included is a means for applying an axle control algorithm to the at least one axle velocity signal, and finally, a means for determining at least one axle damping command as a function of the axle control algorithm.

Another embodiment of the invention provides a computer readable medium storing a computer program providing computer readable code for applying an axle control algorithm to an at least one axle velocity signal, and computer readable code for determining at least one axle damping command as a function of the axle control algorithm.

The foregoing and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

DETAILED DESCRIPTION OF THE INVENTION

Figure 1:
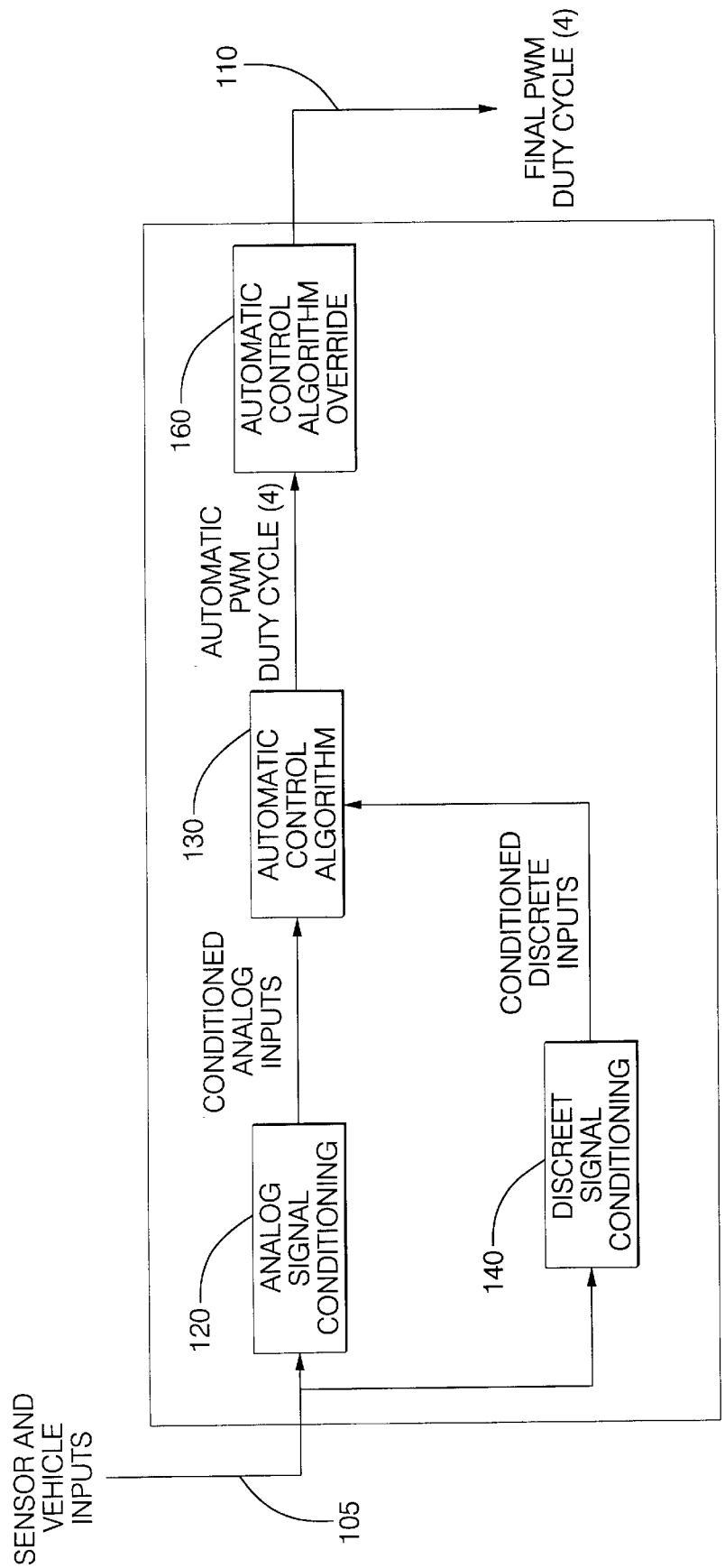
FIG. 1 is a block diagram of one embodiment of a continuously variable real-time damping control module algorithm in accordance with the invention.

Many types of variable force damping system control module algorithms are known to the art, however the control algorithms known to the art lack the use of an axle control algorithm. Referenced in FIG. 1 is one embodiment of a continuously variable real-time damping (CVRTD) control module algorithm 100 that utilizes an axle control algorithm. Sensor (also called vehicle sensor) and vehicle inputs 105 may include measured vehicle variables and preset constants, which flow to and from individual modules altering the input conditions through multiple processes. In one embodiment of the invention, the sensor and vehicle inputs 105 can include axle velocity sensors. Vehicle inputs can be any static or variable input that is not provided by a sensor. The resultant signals provide distinct damping system commands at output 110. CVRTD is one embodiment of a variable force damping system and is used throughout the detailed description of the invention. Alternate damping systems however, may also be used. In the CVRTD control module algorithm 100, information is processed through internal modules providing analog signal conditioning 120, a automatic control algorithm 130, discrete signal conditioning 140, and an automatic control algorithm override module 160. It is in the automatic control algorithm 130 of this embodiment that the present invention resides.

Figure 2:
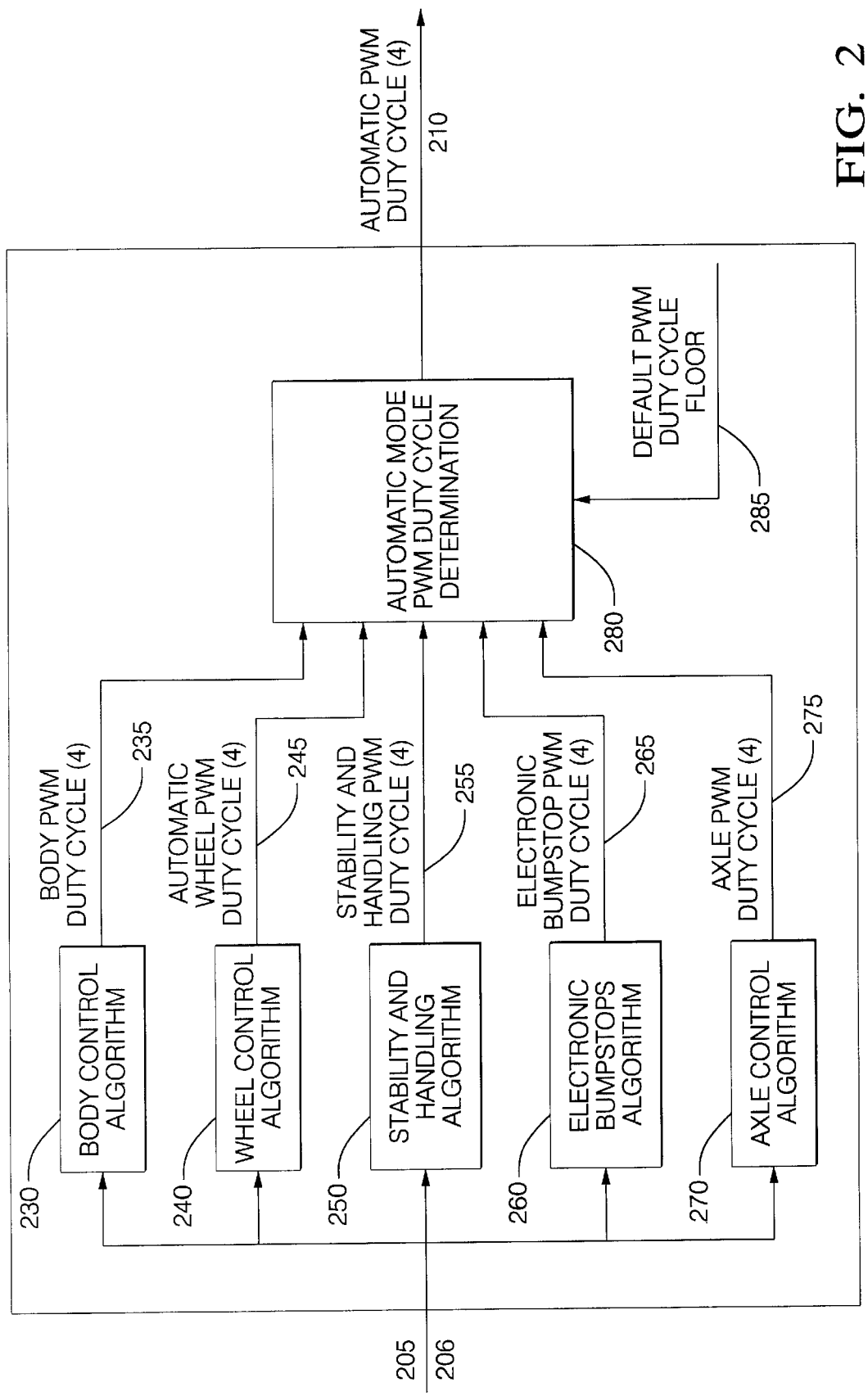
FIG. 2 is a block diagram of one embodiment of an automatic control module algorithm imbedded in the continuously variable real-time damping control module algorithm of FIG. 1.

FIG. 2 is presented as one embodiment for the automatic control algorithm 130, and illustrates conditioned analog inputs 205, conditioned discrete inputs 206 and outputs 210 as well as the internal processes required to provide for the outputs 210. The internal processes for this embodiment of the automatic control algorithm 130 provide the following functionality shown as modules:

Body Control Algorithm 230
Wheel Control Algorithm 240
Stability and Handling Algorithms 250
Electronic Bumpstop Algorithms 260
Axle Control Algorithm 270
Automatic Mode PWM Duty Cycle Determination and Scaling 280

The inputs 205/206, of the automatic control algorithm 130, are a processed and unprocessed subset of the sensor and vehicle inputs 105. Outputs 210 from the automatic control algorithm 130 consist of an automatic PWM duty cycle 210. Additionally the outputs 235, 245, 255, 265, and 275 from respective modules 230, 240, 250, 260, and 270, and the Default PWM Duty Cycle Floor calibration 285 are shown as input variables to the automatic mode PWM duty cycle determination 280. The automatic control algorithms 130 output 210 is used by the CVRTD control module algorithm 100 for further processing.

The above-mentioned software functional blocks illustrate one embodiment for modular implementation of the automatic control algorithm 130. The actual implementation may vary from the structure illustrated in FIG. 2. The Body Control Algorithm 230, Wheel Control Algorithm 240, Stability and Handling Algorithms 250, and Electronic Bumpstop Algorithms 260 are all known to the art and will be referenced only as needed to further explain the invention.

The axle control algorithm 270 allows elevated damping levels to be commanded over large road inputs which affect the two wheels of a given axle similarly, in order to augment the commands provided by the body control algorithm 230, which incorrectly assumes unlimited suspension travel. For example, when a large positive input occurs as on the backside of a large swell event, the two front corners and two rear corners will tend to see very similar velocity profiles. Body control algorithms 230 known in the art will withhold control until body motions result, thus allowing more severe compression bumpstop entry. Although this situation can be similarly addressed by using the electronic bumpstop algorithm 260, the axle control algorithm 270 is able to improve the response to large events with fewer undesirable side effects. As previously mentioned, compression and rebound bumpstops are defined as damper positions at which either full metal to metal impact and/or compression of one or more hard rubber parts occurs. The axle control algorithm 270 is one embodiment of the present invention and is illustrated in detail in FIG. 3.

Figure 3:
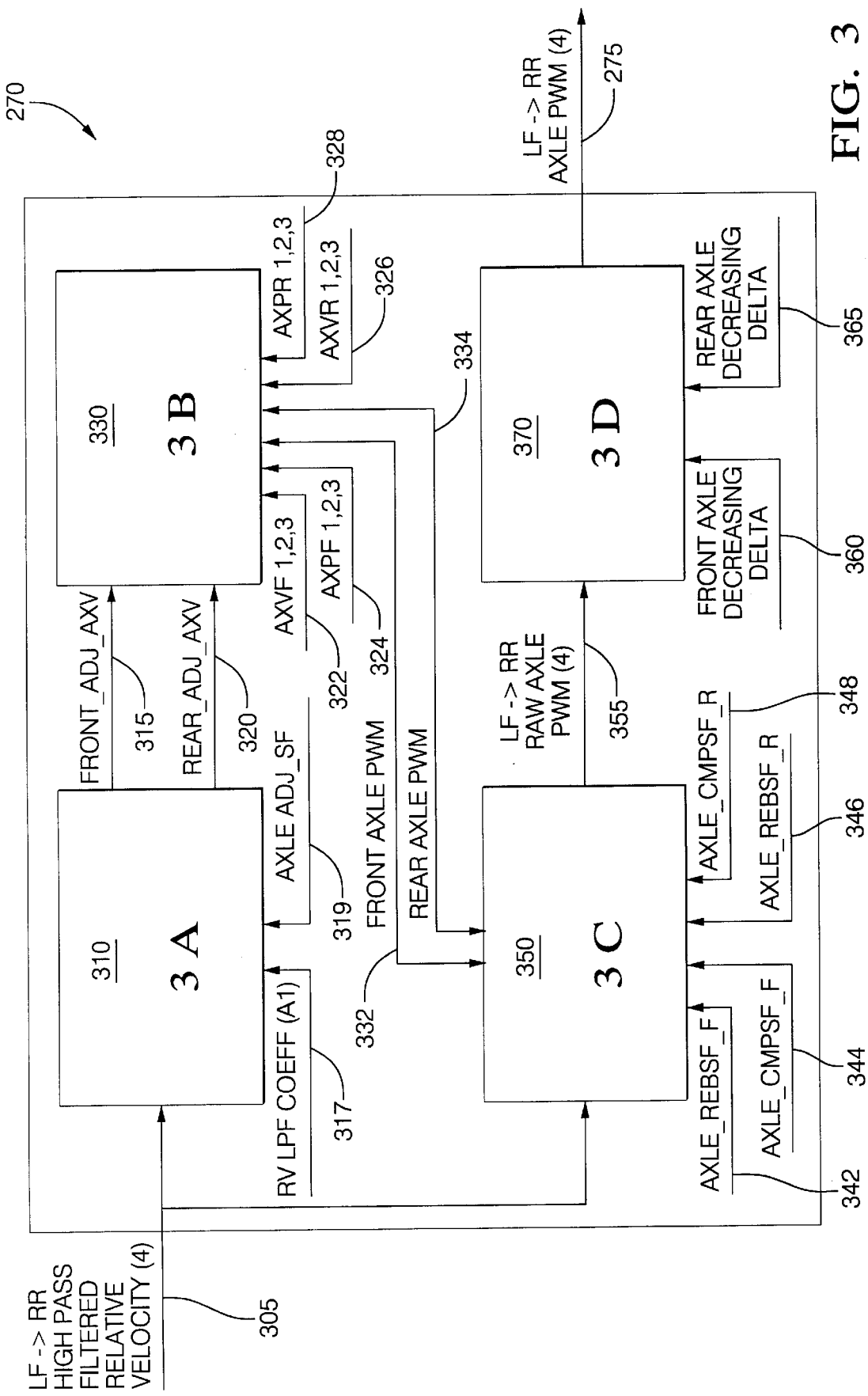
FIG. 3 is a block diagram of one embodiment of an axle control algorithm imbedded in the automatic control module algorithm of FIG. 2.
Figure 3:
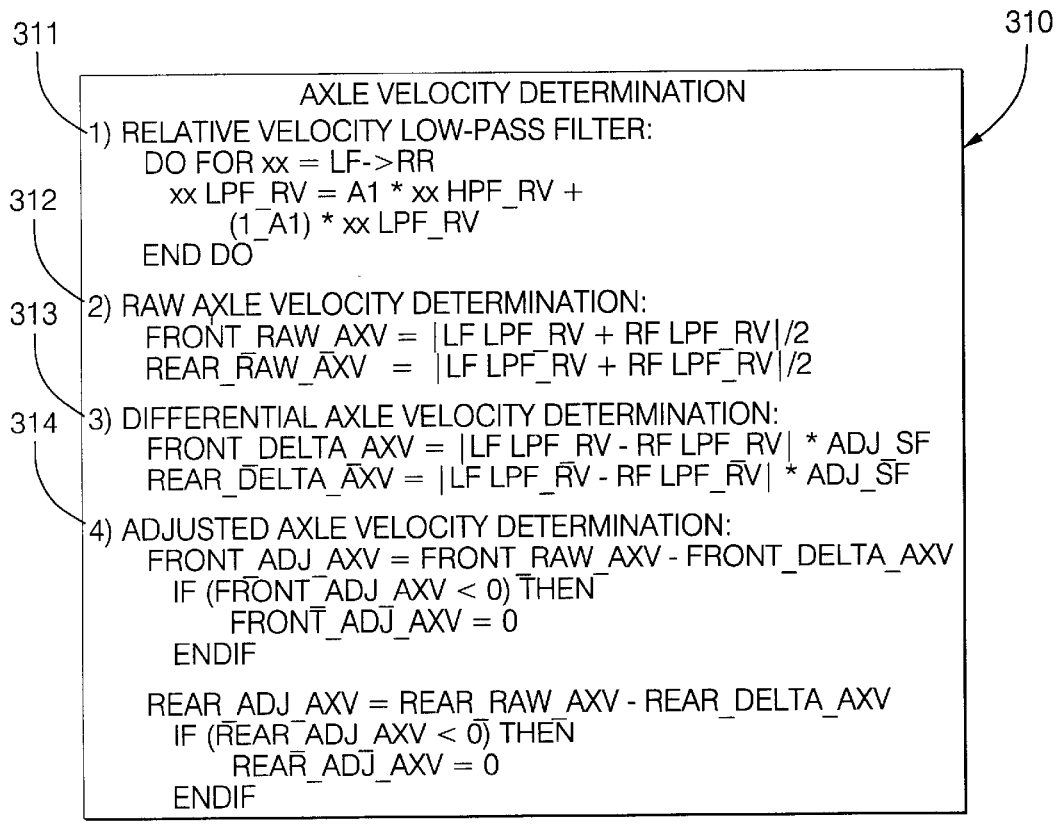
Figure 3:
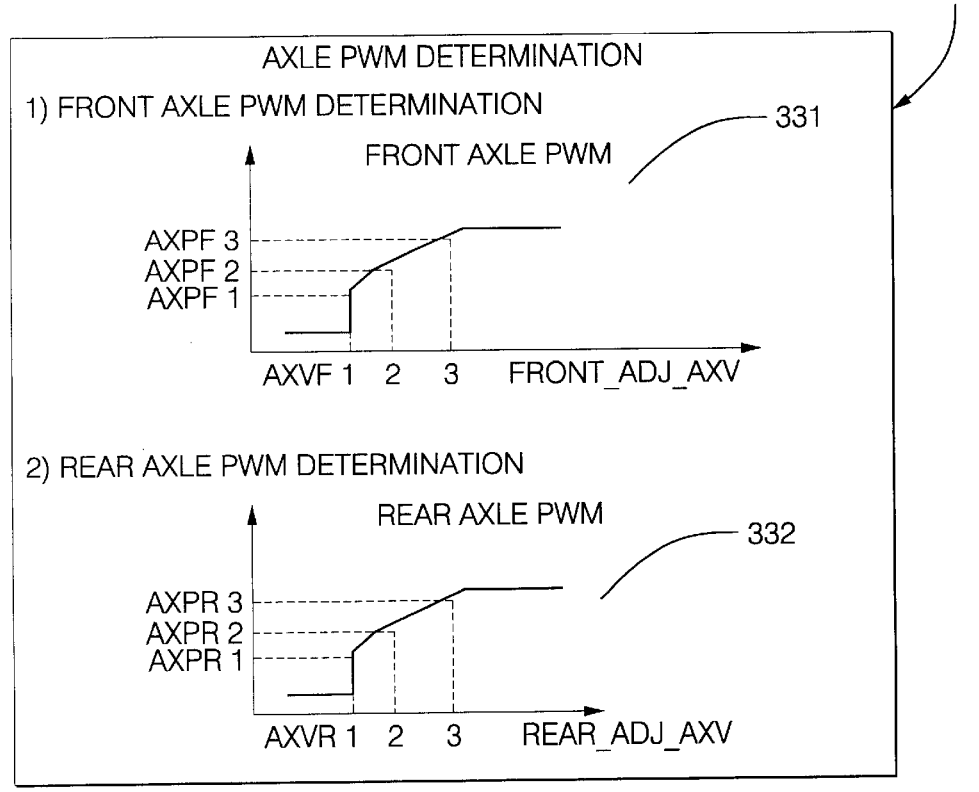

The axle control algorithm 270, illustrated in FIG. 3 shows a high pass filtered relative velocity input 305 that contains all 4 corner signals, and is part of the input list 205, 206. After processing the axle control algorithm 270, the signal information output 275 contains the 4 axle PWM signal further used by the automatic control algorithm 130. In FIG. 3, as well as in the description to follow, the Axle Control Algorithm 270 is broken down into the following distinct functional blocks, or modules:

Axle Velocity Determination 310
  Relative Velocity Low-Pass Filter 311
  Raw (Common) Axle Velocity Determination 312
  Differential Axle Velocity Determination 313
  Adjusted Axle Velocity Determination 314
Axle PWM Determination 330
Axle Corner PWM Determination 350
Axle PWM Slew Rate Limitation 370

The input to the axle velocity determination 310 includes the four high-pass filtered relative velocity signals 305, a relative velocity low pass filter coefficient 317, and a axle differential adjustment scale factor 319. The four high-pass filtered relative velocity signals 305 are subjected to a digital low-pass filter (LPF) to determine the low-pass filtered relative velocity signals 311. In one embodiment a single-pole, infinite impulse response (IIR) low-pass filter can be used. The filter pole can be stored as an EEPROM calibration. The relative velocity low pass filter parameters are depicted in the table below.

| | |
|---|---|
| Input(s) | LF–>RR High-Pass Filtered Relative Velocity (4) 305 |
| Output(s) | LF–>RR Low-Pass Filtered Relative Velocity (4) |
| Calibration(s) | Relative Velocity LPF Coeff (A1) 317 |

The relative velocity low pass filter 311 can be implemented using the transfer function $$H(z) = \frac{A_1}{1 - (1 - A_1)z^{-1}}$$

where H(z) is a discrete or 'z' domain transfer function relating the z-transform of the filter output to that of the filter input, and $A_1$ is the EEPROM Low-Pass Filter calibration 317. The desired low-pass filter transfer function is implemented using $Y(k)=(1-A_1)*Y(k-1)+A_1*X(k)$, where $A_1$=filter constant, Y(k)=Filter Output, Y(k-1)=Previous Filter Output, and X(k)=Filter Input.

Next, the raw or "common" axle velocity determination 312 is processed. The process includes computing the front and rear raw axle velocity signals by averaging the corresponding low-pass filtered relative velocity signals from the relative velocity low-pass filter 311. The calculations can be provided by software performing the following equations, or equivalent:

Front Raw Axle Velocity=|LF LPF_RV+RF LPF_RV|/2

Rear Raw Axle Velocity=|LR LPF_RV+RR LPF_RV|/2

The parameters for this function are depicted in the table below.

| Inputs(s) | LF->RR Low-Pass Filtered Relative Velocity (4) 311 |
|---|---|
| Outputs(s) | Front Raw Axle Velocity 312 |
| | Rear Raw Axle Velocity 312 |
| Calibrations(s) | NONE |

The axle velocity determination 310 also requires a differential axle velocity determination 313. To achieve this, the front and rear raw axle velocity signals as determined by 312, are computed by forming the difference between the corresponding low-pass filtered relative velocity signals from 311, and multiplying by a calibratable scale factor 319. In one embodiment, the software providing the differential axle velocity determination may contain the following equations, or equivalent:

Front Delta Axle Velocity=$|LF\ LPF\_RV-RF\ LPF\_RV|$*Axle Adj_SF

Rear Delta Axle Velocity=$|LR\ LPF\_RV-RR\ LPF\_RV|$*Axle Adj_SF

The parameters for these functions are depicted in the table below.

| Inputs(s) | LF->RR Low-Pass Filtered Relative Velocity (4) 311 |
|---|---|
| Outputs(s) | Front Delta Axle Velocity 313 |
| | Rear Delta Axle Velocity 313 |
| Calibrations(s) | Axle Differential Adjustment Scale Factor (Axle Adj_SF) 319 |

The final step for processing the axle velocity determination 310 is to perform operations of the adjusted axle velocity determination 314. This step computes the front 315 and rear 320 adjusted axle velocity signals by subtracting the front and rear delta axle velocity signals of 313, from the front and rear raw axle velocities from 312 respectively, and setting the result to zero if negative. In one embodiment, operational software may provide the following equations and logic, or equivalent:

Front Adjusted Axle Velocity=Front Raw Axle Velocity-Front Delta Axle Velocity

If (Front Adjusted Axle Velocity<0) then Front Adjusted Axle Velocity=0

Endif

Rear Adjusted Axle Velocity=Rear Raw Axle Velocity-Rear Delta Axle Velocity

If (Rear Adjusted Axle Velocity<0) then Rear Adjusted Axle Velocity=0

Endif.

The parameters for this function are depicted in the table below.

| Inputs(s) | Front Raw Axle Velocity 312 |
|---|---|
| | Rear Raw Axle Velocity 312 |
| | Front Delta Axle Velocity 313 |
| | Rear Delta Axle Velocity 313 |
| Outputs(s) | Front Adjusted Axle Velocity 315 |
| | Rear Adjusted Axle Velocity 320 |
| Calibrations(s) | NONE |

With the completion of the axle velocity determination 310 module, the values of the front adjusted axle velocity 315 and the rear adjusted axle velocity 320 can be passed to the axle PWM determination module 330. In one embodiment of the invention, the suspension damping system may use actuators that are controlled by a PWM (Pulse Width Modulation) signal. However, actuators of another type not based on PWM signals can be substituted in alternative embodiments. Within alternative embodiments, reference to PWM signals may be named "damping command" to designate command signals to alternative actuators. It will be recognized that variable force controls other than those with PWM are equivalent to the PWM controlled signal example set forth herein.

In one embodiment, the axle PWM determination 330 produces separate front and rear axle PWM signals that can be computed by using the front and rear adjusted axle velocity signals 315 and 320 respectively, as inputs to separate front and rear three-point look-up tables. The parameters for this function are summarized in the table below:

| Inputs(s) | Front Adjusted Axle Velocity (AAXVF) 315 |
|---|---|
| | Rear Adjusted Axle Velocity (AAXVR) 320 |
| Outputs(s) | Front Axle PWM 332 |
| | Rear Axle PWM 334 |
| Calibrations(s) | Front Axle Velocity 1, 2, & 3 (AXVF1, AXVF2, AXVF3) 322 |
| | Front Axle PWM 1, 2 & 3 (AXPF1, AXPF2, AXPF3) 324 |
| | Rear Axle Velocity 1, 2, & 3 (AXVR1, AXVR2, AXVR3) 326 |
| | Rear Axle PWM 1, 2 & 3 (AXPR1, AXPR2, AXPR3) 328 |

The front and rear axle PWM signals 332 and 334 output from the axle PWM determination module 330, can be computed using the following equations and logic, or equivalent:

DO For x=Front, Rear

If (x Adjusted Axle Velocity<AXVx1) then xAxle PWM=0

Elseif (x Adjusted Axle Velocity<AXVx2) then xAxle $PWM=AXPx1+(AXPx2-AXPx1)*(AAXVx-AXVx1)/(AXVx2-AXVx1)$ Elseif (x Adjusted Axle Velocity<AXVx3) then xAxle $PWM=AXPx2+(AXPx3-AXPx2)*(AAXVx-AXVx2)/(AXVx3-AXVx2)$ Else xAxle $PWM=AXPx3$ Endif
End DO.

With the resulting front and rear axle PWM signals 332 and 334, one embodiment of the axle corner PWM determination module 350 produces separate axle PWM signals

355. The separate axle PWM signals 355 can be computed for each corner by applying compression or rebound scale factors to the front or rear axle PWM signals 332 and 334 as appropriate, based on the sign of the corresponding high-pass filtered relative velocity signal 305. The parameters for this function are summarized in the table below:

| | |
|---|---|
| Inputs(s) | Front Axle PWM 332 |
| | Rear Axle PWM 334 |
| Outputs(s) | LF->RR Raw Axle PWM 355 |
| Calibrations(s) | Front Axle Compression Scale Factor (Axle_Cmpsf_F) 342 |
| | Front Axle Rebound Scale Factor (Axle_Rebsf_F) 344 |
| | Rear Axle Compression Scale Factor (Axle_Cmpsf_R) 346 |
| | Rear Axle Rebound Scale Factor (Axle_Rebsf_R) 348 |

The front and rear raw axle corner PWM signals 355 can be computed using the following equations and logic, or equivalent:

DO For FRONT Corners (xx=LF, RF)
  If (xx High-Pass Filtered RV>0) then

*xx*Raw Axle *PWM*=Front Axle *PWM*\*Front Axle Rebound Scale Factor

Else

*xx*Raw Axle *PWM*=Front Axle *PWM*\*Front Axle Compression Scale Factor

Endif
End DO
DO For REAR Corners (xx=LR, RR)
  If (xx High-Pass Filtered RV>0) then

*xx*Raw Axle *PWM*=Rear Axle *PWM*\*Rear Axle Rebound Scale Factor

Else

*xx*Raw Axle *PWM*=Rear Axle *PWM*\*Rear Axle Compression Scale Factor

Endif
End DO

The resulting raw axle corner PWM 355 is used for axle PWM slew rate limitation 370. In one embodiment, the axle PWM slew rate limitation 370 is the final step in the Axle Control algorithm 270, and can provide the effect of a 'hold' function known in the art, through downward only slew rate limitation of the raw axle corner PWM signals 355 to obtain the filtered axle corner PWM signals 275. The parameters for this embodiment of the function are summarized in the table below:

| | |
|---|---|
| Inputs(s) | LF->RR Raw Axle PWM (4) 355 |
| Outputs(s) | LF->RR Filtered Axle PWM (4) 275 |
| Calibrations(s) | Front Axle Decreasing Delta 360 |
| | Rear Axle Decreasing Delta 365 |

The LF through RR filtered axle PWM signals 275 can be computed from the LF through RR raw axle PWM signals 355 using the following equations and logic, or equivalent:

DO for EACH corner (xx=LF through RR)
  IF FRONT Corner (xx=LF, RF) then
    Delta=Front Axle Decreasing Delta
  Else
    Delta=Rear Axle Decreasing Delta
  Endif
  If xx Raw Axle PWM>xx Filtered Axle PWM then
    xx Filtered Axle PWM=xx Raw Axle PWM
  Elseif (xx Filtered Axle PWM−xx Raw Axle PWM<Delta) then
    xx Filtered Axle PWM=xx Raw Axle PWM
  Else
    xx Filtered Axle PWM=xx Filtered Axle PWM−Delta
  Endif
End DO In the above mentioned logic, the front and rear axle decreasing delta calibrations 360 and 365 are a measure of maximum change per loop. In addition, the Filtered Axle PWM signals 275 may also be referred to as the 'Axle PWM' signals.

Referring back to FIG. 2, the automatic mode PWM duty cycle determination 280 function determines the final automatic PWM duty cycles for each corner. Though determining the final automatic PWM duty cycles for each corner can be used by alternative embodiments, it is described here with reference to the axle PWM signals 275.

The automatic mode PWM duty cycle determination module 280 provides a default PWM floor value for the front and rear corners for the electronic adjustment of the minimum, or 'low-level' damping curves which apply when elevated PWM levels are not required. In the embodiment of FIG. 2, the default PWM floor value, which may optionally be different for front and rear corners, and may be altered based upon external commands such as a driver input switch, is provided as a single calibration value 285.

The automatic mode PWM duty cycle determination module 280 can determine the automatic PWM duty cycle for each corner by selecting the largest of the applicable PWM floor, body PWM, wheel PWM, stability PWM and bumpstop PWM values. The parameters for this function are summarized in the table below:

| | |
|---|---|
| Inputs(s) | Body PWM (4) 235 |
| | Wheel PWM (4) 245 |
| | Stability PWM (4) 255 |
| | Bumpstop PWM (4) 265 |
| | Axle PWM (4) 275 |
| | Default PWM Duty Cycle Floor 285 |
| Outputs(s) | Automatic PWM Duty Cycle (4) 210 |
| Calibrations(s) | None |

The corner PWM duty cycle determination can be calculated using the following equations and logic, or equivalent:

DO For Front Corners (xx=LF or RF)
  xx Automatic PWM=MAX (xx Body PWM, xx Wheel PWM, xx Stability PWM, xx Bumpstop PWM, xx Axle PWM, Default Front Floor)
End DO
DO For Front Corners (xx=LR or RR)
  xx Automatic PWM=MAX (xx Body PWM, xx Wheel PWM, xx Stability PWM, xx Bumpstop PWM, xx Axle PWM, Default Rear Floor)
End DO.

Thus the automatic PWM duty cycle 210 has been determined incorporating the axle PWM 275 in order to provide increased motion control and reduced compression bumpstop activation during large events.

The above-described implementations of this invention are example implementations. Moreover, various other improvements and modifications to this invention may occur to those skilled in the art and those improvements and modifications will fall within the scope of this invention as set forth below.

What is claimed is:

1. A method for independent axle control of a variable force damper system, comprising:

providing at least one axle velocity signal from at least one vehicle sensor;

applying an axle control algorithm to the at least one axle velocity signal; and determining at least one axle damping command as a function of the axle control algorithm.

2. The method of claim 1 wherein the axle control algorithm is comprised of an axle velocity determination algorithm, an axle damping command determination algorithm, an axle corner damping command determination algorithm, and an axle damping command slew rate limitation algorithm.

3. A method for independent axle control of a variable force damper system, comprising:

providing at least one axle velocity signal from at least one vehicle sensor;

applying an axle control algorithm to the at least one axle velocity signal, said axle control algorithm comprising an axle velocity determination algorithm, an axle damping command determination algorithm, an axle corner damping command determination algorithm, and an axle damping command slew rate limitation algorithm; and said axle control algorithm further comprising determining an adjusted axle velocity as a function of the at least one axle velocity signal, a provided relative velocity low-pass filter coefficient, a provided axle differential adjustment scale factor, and an axle velocity determination algorithm; and determining at least one axle damping command as a function of the axle control algorithm.

4. The method of claim 3 wherein the axle velocity determination algorithm is comprised of a relative velocity low-pass filter, a raw axle velocity determination, a differential axle velocity determination, and an adjusted axle velocity determination.

5. The method of claim 4 wherein the raw axle velocity determination comprises calculating a front and rear raw axle velocity signal by averaging the corresponding relative velocity low-pass filtered signals.

6. The method of claim 4 wherein the relative velocity low-pass filter coefficient is created by a single-pole infinite impulse response low-pass filter.

7. The method of claim 4 wherein the differential axle velocity determination comprises computing the difference between the front and rear low-pass filtered relative velocity signals and multiplying the result by a calibratable scale factor.

8. The method of claim 4 wherein the adjusted axle velocity determination comprises subtracting a front differential axle velocity signal from a front raw axle velocity to determine a first result, and subtracting a rear differential axle velocity signal from a rear raw axle velocity to determine a second result, setting the first result to zero if it is negative, and setting the second result to zero if it is negative.

9. The method of claim 3 wherein the adjusted axle velocity comprises a front and rear axle velocity.

10. The method of claim 3 further comprising determining an axle damping command as a function of the adjusted axle velocity, a provided axle velocity, a provided axle damping command, and the axle damping command determination algorithm.

11. The method of claim 10 wherein the axle damping command determination algorithm comprises a front and a rear look-up table.

12. The method of claim 10 wherein the axle damping command determination comprises a front axle damping command and a rear axle damping command.

13. The method of claim 10 wherein the axle velocity comprises a front and rear axle velocity.

14. The method of claim 10 wherein the axle damping command comprises a front and rear axle damping command.

15. The method of claim 10 further comprising determining a left front, right front, left rear, and right rear raw axle damping command as a function of front and rear axle damping commands, a provided corresponding axle compression scale factor, a provided axle rebound scale factor, and an axle corner damping command determination algorithm.

16. The method of claim 15 wherein the axle corner damping command determination algorithm comprises:

DO For FRONT Corners (xx=LF, RF)
  If (xx High-Pass Filtered RV>0) then xx Raw Axle damping command=Front Axle damping command*Front Axle Rebound Scale Factor Else xx Raw Axle damping command=Front Axle damping command*Front Axle Compression Scale Factor
  Endif
End DO
DO For REAR Corners (xx=LR, RR)
  If (xx High-Pass Filtered RV>0) then xx Raw Axle damping command=Rear Axle damping command*Rear Axle Rebound Scale Factor
  Else xx Raw Axle damping command=Rear Axle damping command*Rear Axle Compression Scale Factor
  Endif
End DO.

17. The method of claim 16 further comprising determining a left front, right front, left rear, and right rear axle damping command as a function of an axle damping command slew rate limitation algorithm, the left front, right front, left rear, and right rear raw axle damping commands, a provided front axle decreasing delta, and a provided rear axle decreasing delta.

18. The method of claim 17 wherein the axle damping command slew rate limitation algorithm comprises:

DO for EACH corner (xx=LF through RR)
  IF FRONT Corner (xx=LF, RF) then
    Delta=Front Axle Decreasing Delta
  Else
    Delta=Rear Axle Decreasing Delta
  Endif
  If xx Raw Axle damping command>xx Filtered Axle damping command then xx Filtered Axle damping command=xx Raw Axle damping command
Elseif (xx Filtered Axle damping command−xx Raw Axle damping command<Delta) then
   xx Filtered Axle damping command=xx Raw Axle damping command
Else
   xx Filtered Axle PWM=xx Filtered Axle damping command−Delta
Endif
End DO.

19. A system for independent axle control of a variable force damper system, comprising:

means for providing at least one axle velocity signal;

means for applying an axle control algorithm to the at least one axle velocity signal; and means for determining at least one axle damping command as a function of the axle control algorithm.

20. A computer readable medium storing a computer program comprising:

computer readable code for applying an axle control algorithm to the at least one axle velocity signal; and computer readable code for determining at least one axle damping command as a function of the axle control algorithm.

\* \* \* \* \*